(12) United States Patent  
Leahy et al.

(10) Patent No.: US 7,762,785 B2
(45) Date of Patent: Jul. 27, 2010

(54) MAIN ROTOR BLADE WITH INTEGRAL TIP SECTION

(75) Inventors: Kevin P. Leahy, Naugatuck, CT (US); Richard Joseph Simkulak, Meriden, CT (US); Wonsub Kim, Orange, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 238 days.

(21) Appl. No.: 11/953,440

(22) Filed: Dec. 10, 2007

(65) Prior Publication Data

US 2009/0148302 A1 Jun. 11, 2009

(51) Int. Cl.
*B64C 11/20* (2006.01)
(52) U.S. Cl. ..................................... 416/226
(58) Field of Classification Search ................ 416/226, 416/228, 237, 238; 244/124, 199.2
See application file for complete search history.

(56) References Cited

U.S. PATENT DOCUMENTS

| | | | |
|---|---|---|---|
| 2,460,351 A | 2/1949 | Hoffman et al. | |
| 3,721,507 A * | 3/1973 | Monteleone | 416/228 |
| 4,120,610 A * | 10/1978 | Braswell et al. | 416/226 |
| 4,142,837 A | 3/1979 | de Simone | |
| 4,295,790 A | 10/1981 | Eggert, Jr. | |
| 4,324,530 A * | 4/1982 | Fradenburgh et al. | 416/228 |
| 4,412,664 A | 11/1983 | Noonan | |
| 4,776,531 A | 10/1988 | Noonan | |
| 4,880,355 A | 11/1989 | Vuillet et al. | |
| 5,035,577 A | 7/1991 | Damongeot | |
| 5,320,494 A * | 6/1994 | Reinfelder et al. | 416/226 |
| 5,332,362 A | 7/1994 | Toulmay et al. | |
| 5,885,059 A * | 3/1999 | Kovalsky et al. | 416/226 |
| 5,954,898 A | 9/1999 | McKague et al. | |
| 6,000,911 A | 12/1999 | Toulmay et al. | |
| 6,116,857 A | 9/2000 | Splettstoesser et al. | |
| 6,168,383 B1 | 1/2001 | Shimizu | |
| 6,231,308 B1 | 5/2001 | Kondo et al. | |
| 6,364,615 B1 | 4/2002 | Toulmay et al. | |
| 6,976,829 B2 | 12/2005 | Kovalsky et al. | |
| 2005/0013694 A1 * | 1/2005 | Kovalsky et al. | 416/226 |

OTHER PUBLICATIONS

Search Report and Written Opinion mailed on Aug. 17, 2009 for PCT/US2008/084446.
Search Report and Written Opinion mailed on Aug. 19, 2009 for PCT/US2008/084447.
Search Report and Written Opinion mailed on Aug. 21, 2009 for PCT/US2008/084448.

* cited by examiner

*Primary Examiner*—Richard Edgar
(74) *Attorney, Agent, or Firm*—Carlson, Gaskey & Olds PC (57) ABSTRACT

A main rotor blade assembly having a blade skin bonded to a main spar and a tip spar.

22 Claims, 10 Drawing Sheets

MAIN ROTOR BLADE WITH INTEGRAL TIP SECTION

This invention was made with government support with the United States Navy under Contract No.: N00019-06-C-0081. The government therefore has certain rights in this invention.

BACKGROUND OF THE INVENTION

The present invention relates to a rotary wing aircraft main rotor blade, and more particularly to a main rotor blade tip arrangement.

Rotary-wing aircraft rotor blades often include an anhedral tip section of a selected sweep, taper, and form to increase blade performance. Anhedral tip sections increase hover performance and lift capabilities of a rotary wing aircraft. Rotor blade tip sections are subjected to significant stresses/strains due to aerodynamic forces, and concomitantly experience significant structural degradation due to wear and abrasion. These aerodynamic forces may be increased upon a tip section with an anhedral form due to the loads induced thereby.

Conventional anhedral tip sections require numerous components to carry the loads induced by the anhedral form. Conventional anhedral tip sections may include two structural anhedral tip skins, two structural cores along with various non-structural components and redundant fasteners. Structural components may cost five times that of non-structural components and may require multiple expensive manufacturing processes to produce.

SUMMARY OF THE INVENTION

A main rotor blade assembly according to an exemplary aspect of the present invention includes a main spar, a tip spar attached to the main spar and a blade skin bonded to the main spar and the tip spar.

BRIEF DESCRIPTION OF THE DRAWINGS

The various features and advantages of this invention will become apparent to those skilled in the art from the following detailed description of the currently disclosed embodiment. The drawings that accompany the detailed description can be briefly described as follows.

DETAILED DESCRIPTION OF THE DISCLOSED EMBODIMENT

Figure 1:
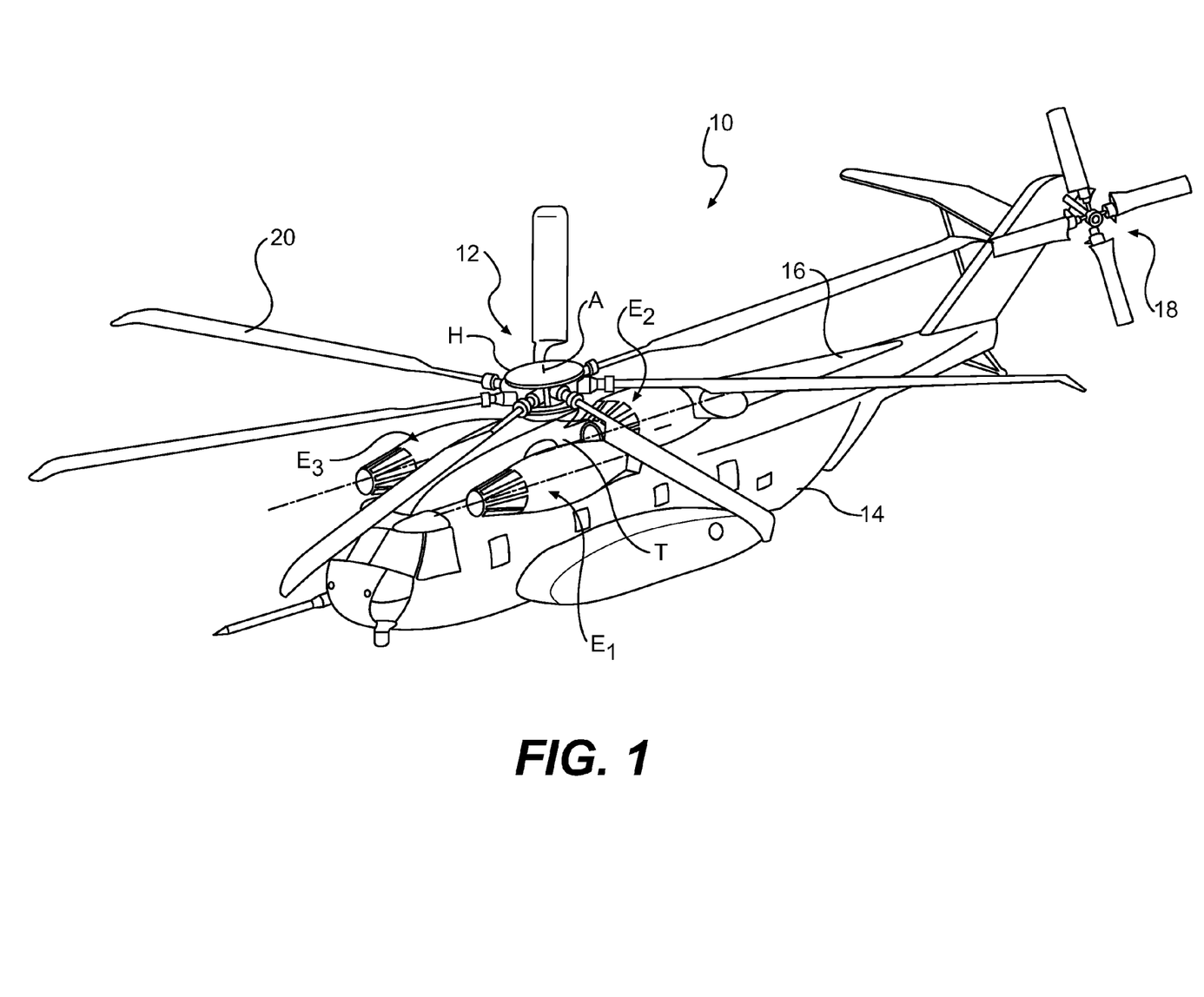
FIG. 1 is a perspective view of a rotary wing aircraft for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven about an axis of rotation A through a main gearbox (illustrated schematically at T) by one or more engines E. The main rotor system 12 includes a multiple of rotor blade assemblies 20 mounted to a rotor hub H. Although a particular helicopter configuration is illustrated and described in the disclosed non-limiting embodiment, other configurations and/or machines, such as high speed compound rotary wing aircraft with supplemental translational thrust systems, dual contra-rotating, coaxial rotor system aircraft, turbo-props, tilt-rotors and tilt-wing aircraft, will also benefit from the present invention.

Figure 2A:
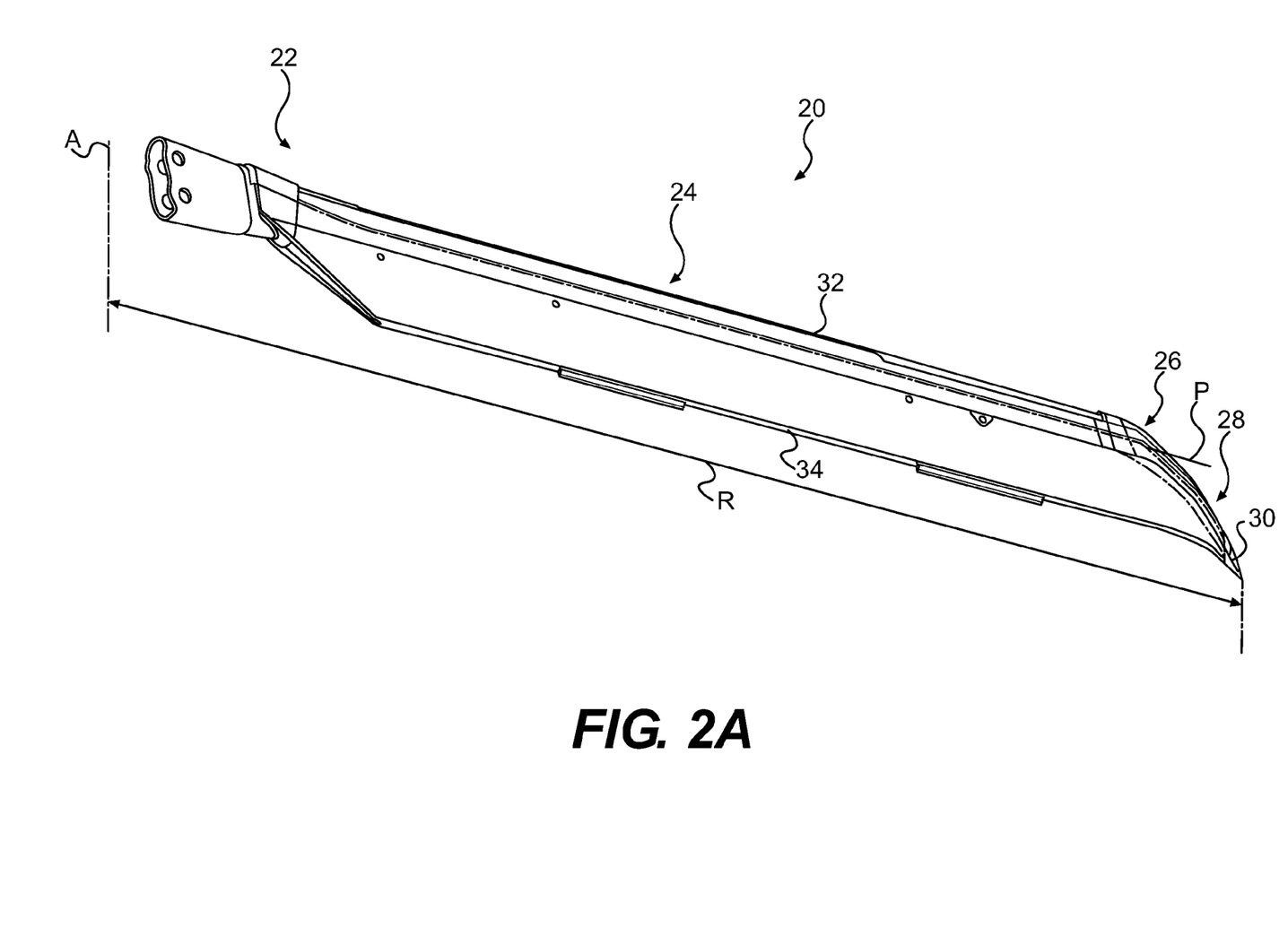
FIG. 2A is a perspective view of a main rotor blade.
Figure 2B:
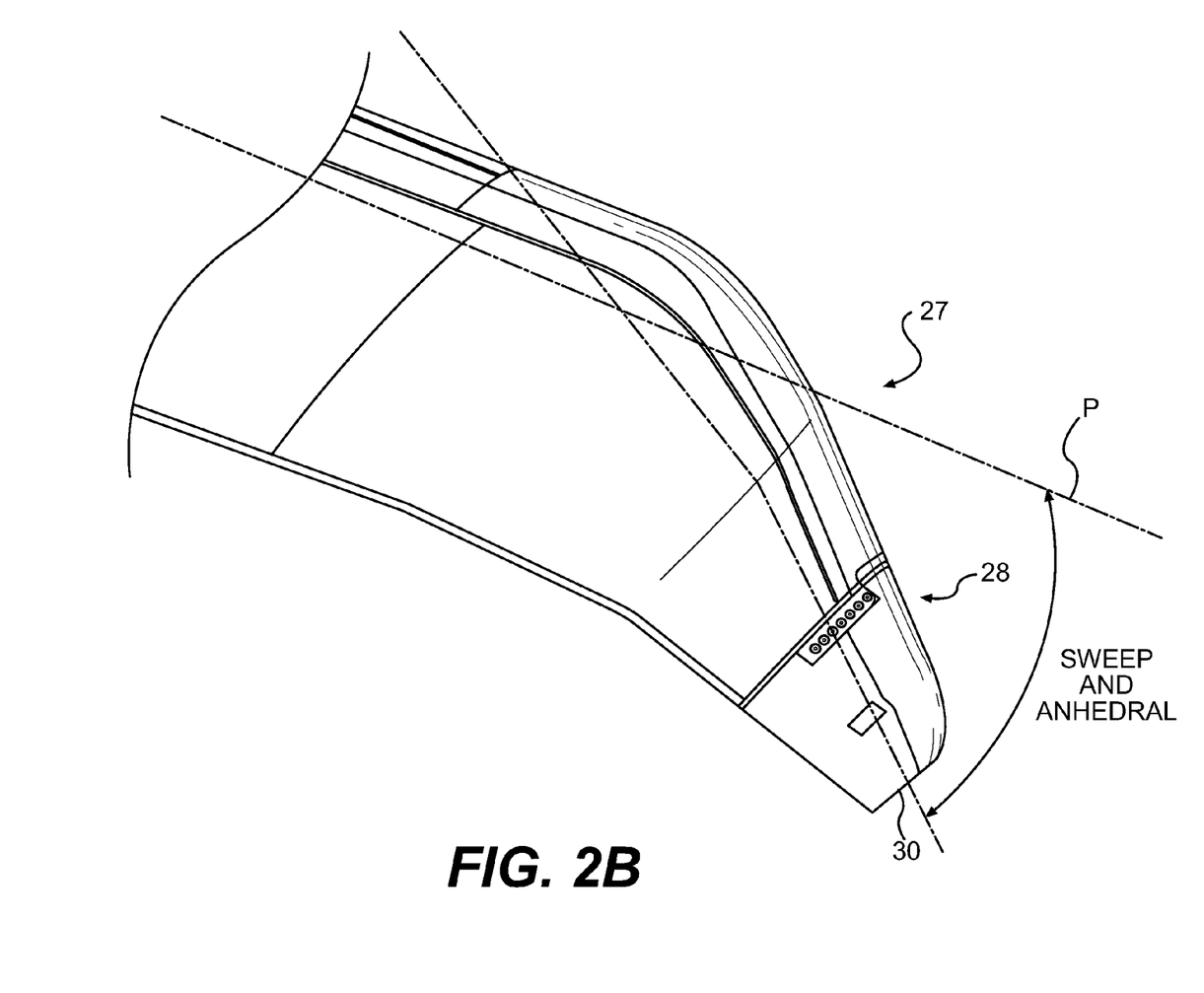
FIG. 2B is an expanded perspective view of a tip section of the rotor blade of FIG. 2A.

Referring to FIG. 2A, each rotor blade assembly 20 of the rotor assembly 12 generally includes a root section 22, an intermediate section 24, a tip section 26 and a tip cap 28. Each rotor blade section 22, 24, 26, 28 may define particular airfoil geometries to particularly tailor the rotor blade aerodynamics to the velocity increase along the rotor blade span. The rotor blade tip section 26 includes an anhedral form 27 (FIG. 2B), however, any angled and non-angled forms such as cathedral, gull, bent, and other non-straight forms will benefit from the present invention. The anhedral form 27 as defined herein may include a rotor blade tip section 26 which is at least partially not contained in a plane defined by the intermediate section 24.

The rotor blade sections 22-28 define a span R of the main rotor blade assembly 20 between the axis of rotation A and a distal end 30 of the tip cap 28 such that any radial station may be expressed as a percentage in terms of a blade radius x/R. The rotor blade assembly 20 defines a longitudinal feathering axis P between a leading edge 32 and a trailing edge 34. The distance between the leading edge 32 and the trailing edge 34 defines a main element chord length Cm.

Figure 3:
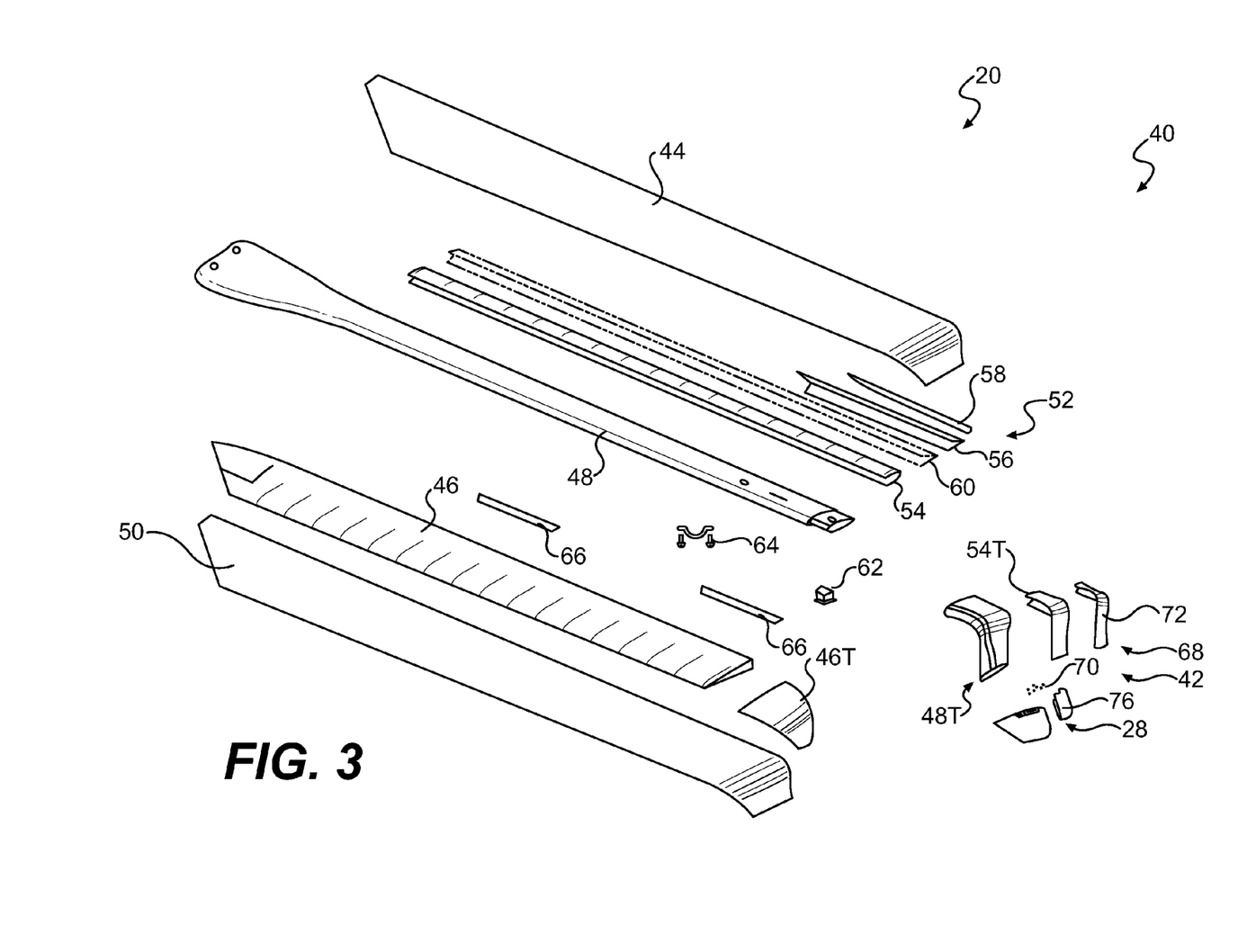
FIG. 3 is an exploded view of a main rotor blade.

Referring to FIG. 3, the rotor blade assembly 20 generally includes a main blade assembly 40 and a tip assembly 42. The main blade assembly 40 includes an upper skin 44 a main core 46, a main spar 48, a lower skin 50, and a leading edge assembly 52. The main spar 48, main core 46 and skins 44, 50 are generally referred to as a pocket assembly, the forward portion of which is closed out by the leading edge assembly 52.

The leading edge assembly 52 generally includes a main sheath laminate 54 upon which is mounted a wear-resistant material such as a titanium erosion strip 56 and a nickel erosion strip 58 to provide abrasion protection. Alternatively, the sheath laminate 54 may include a single erosion strip 60 manufactured of AM355 which replaces the titanium erosion strip 56 and the nickel erosion strip 58. It should be understood that a variety of a wear-resistant materials may alternatively or additionally be provided for the leading edge assembly 52. Additional structures such as weight cups 62, blade tie down fastener structures 64 and trim tab systems 66 may also be provided, further details of which need not be further elaborated herein.

Figure 4:
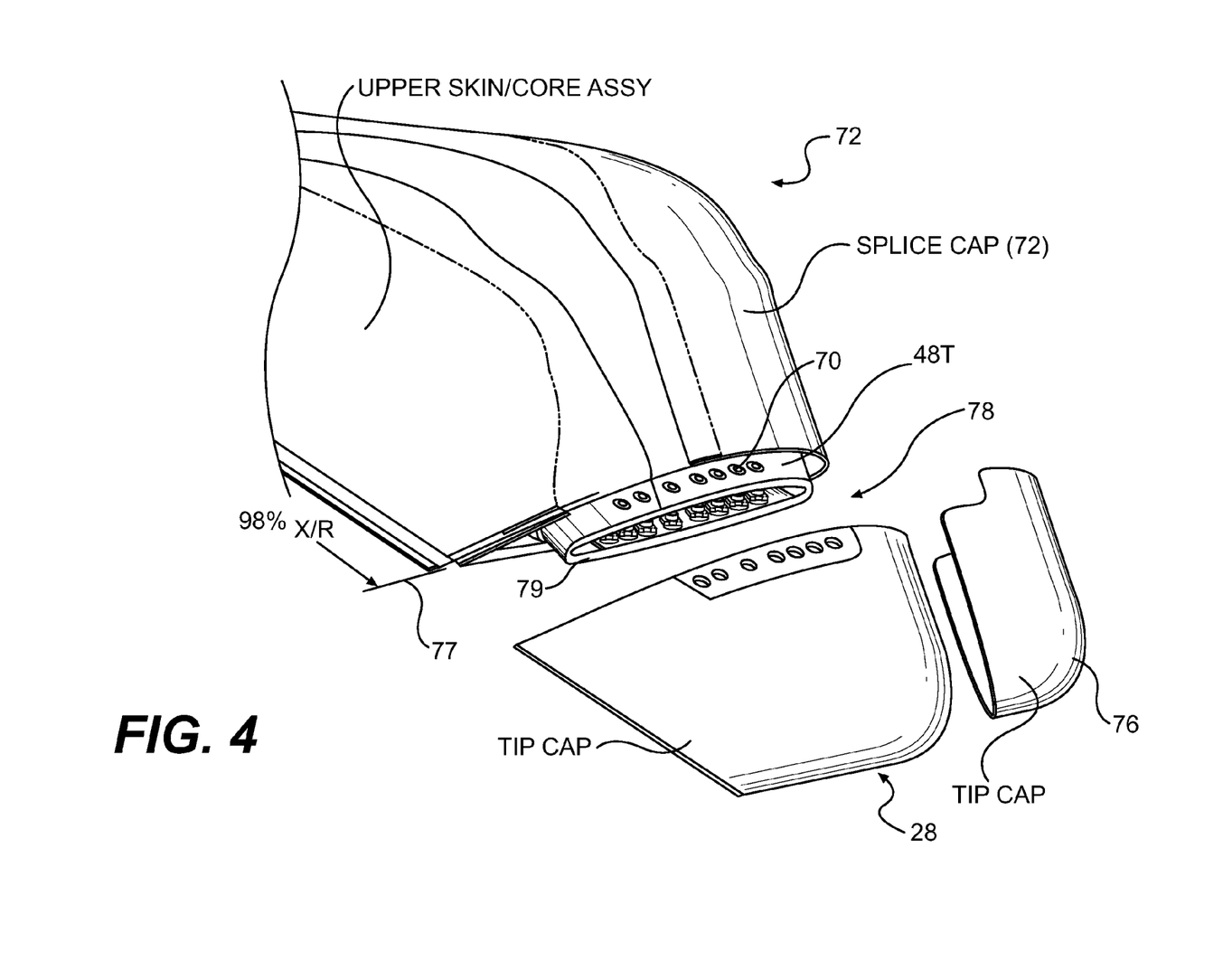
FIG. 4 is an exploded view of a removable tip cap for a main rotor blade.

The tip assembly 42 generally includes a tip spar 48T, a tip core 46T, a tip leading edge assembly 68 and the tip cap 28. The tip cap 28 may be removably attached to the tip spar 48T though hardware 70 in a cap interface 78 (FIG. 4) to close-out the end of the tip assembly 42. The cap interface 78 may be defined at an inboard radial station 77 of approximately ninety eight percent (98% x/R) and end at an outboard radial station 79 which defines the distal end of the tip spar 48T, however other locations may alternatively be provided. It should be understood that other overlap lengths, locations and interfaces may alternatively or additionally be provided.

The tip leading edge assembly 68 may also include a splice cap laminate 54T and a tip erosion strip 72 to provide abrasion protection. The splice cap laminate 54T abuts the main sheath laminate 54 at a tip interface 84 while the tip erosion strip 72 may overlap the tip interface 84 therebetween. The tip cap 28 also includes an erosion cap 76 which may overlap the tip cap interface 78 between the tip assembly 42 and the tip cap 28. The tip erosion strip 72 and the erosion cap 76 may include AM355, titanium, nickel, or a variety of other wear-resistant materials or combinations thereof.

Figure 5A:
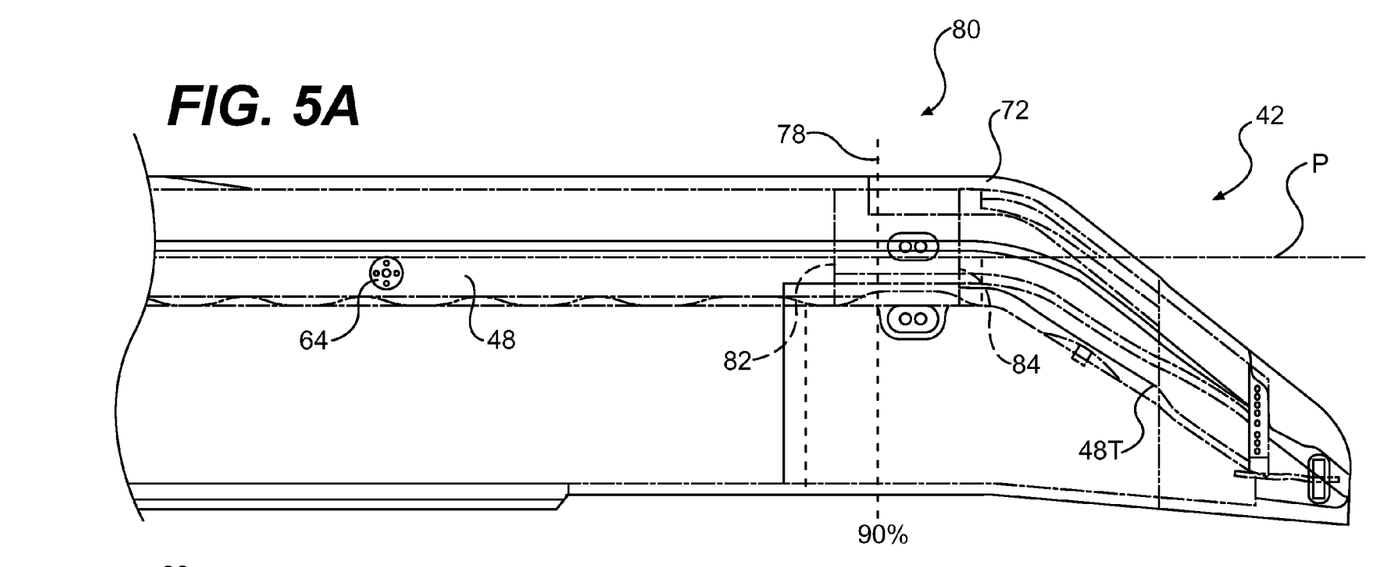
FIG. 5A is a plan view of a tip section of a main rotor blade.
Figure 5B:
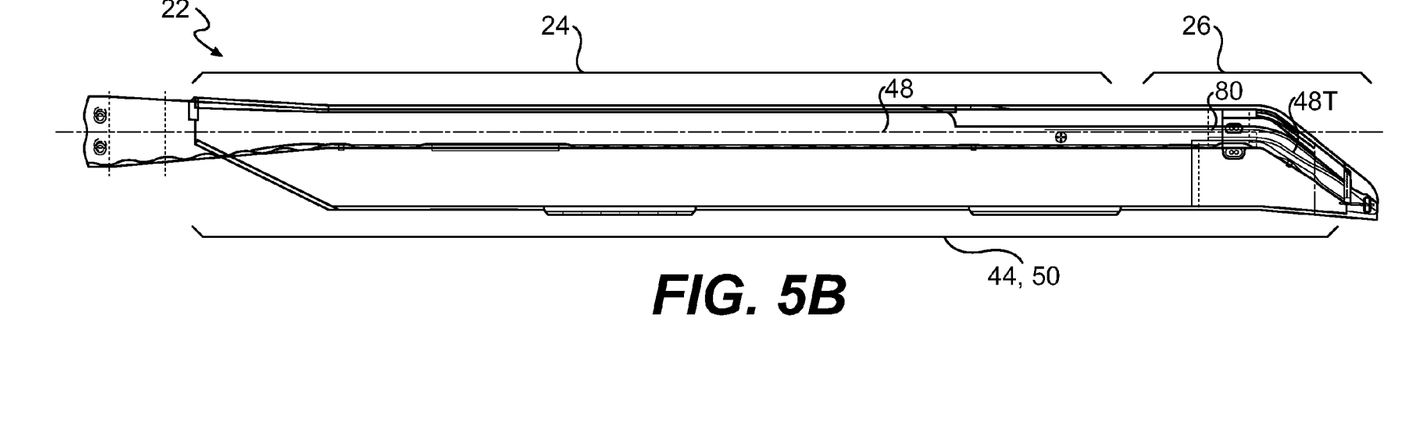
FIG. 5B is a top plan view of a main rotor blade.

Referring to FIG. 5A, the main spar 48 and the tip spar 48T extend along the length of the sections 22-26. The main spar 48 and the tip spar 48T are structural members manufactured of a high strength non-metallic composite material and/or high strength metallic material such as titanium. The main spar 48 is attached to the tip spar 48T in a male-female overlap relationship 80. The upper skin 44 and the lower skin 50 extend outboard of the overlap relationship 80 which allows a contiguous composite skin laminate from the root section 22 through the tip section 26 to define the aerodynamic shape of the blade (FIG. 5B). That is, no separate main skins and tip skins are utilized. In one non-limiting embodiment, the upper skin 44 and the lower skin 50 extend from the root section 22 to the inboard radial station 77 of the cap interface 78 of the tip spar 48T which abuts the tip cap 28. In other words, the upper skin 44 and the lower skin 50 extend past the overlap relationship 80. Lift properties, for example, are significantly increased over conventional rotor blades with separate tip skins due in part to the increased strength of the one-piece composite skin laminate. Should a blade strike occur, the tip assembly 42 will still separate from the main blade assembly 40 at the tip interface 82 such that only the tip spar 48T and related tip assembly 42 components may break away which thereby allows the main blade 20 defined by the main spar 48 to remain flightworthy, albeit with reduced lift capabilities.

The tip spar 48T and the tip core 46T define the anhedral form or other angled and non-angled forms such as cathedral, gull, bent, and others. Furthermore, the tip core 46T may be hot formed to specifically include the anhedral form as well as be of similar or different weight per cubic foot (pcf) as compared to the main core 46 to provide particular lift and strength properties. The anhedral form may be located at a radial station of approximately ninety six percent (96% x/R). It should be understood that the anhedral form or other angled and non-angled forms may be located at other radial stations.

An end section ST of the tip spar 48T is bonded over an end section SM of the main spar 48 (FIG. 5C) to define the overlap relationship 80. An adhesive material, such as epoxy film adhesive, is one example of a bonding agent. The main spar end section SM may be of a reduced perimeter such that a flush outer mold line (OML) spar surface is formed therebetween. That is, the end section SM of the main spar 48 defines a jogged or stepped area to receive the end section ST of the tip spar 48T. The overlap relationship 80 may begin at an inboard radial station 82 of approximately eighty nine percent (89% x/R) and end at an outboard radial station 84 of approximately ninety two percent (92% x/R). It should be understood that other overlap length, locations and interfaces may alternatively or additionally be provided.

Figure 5C:
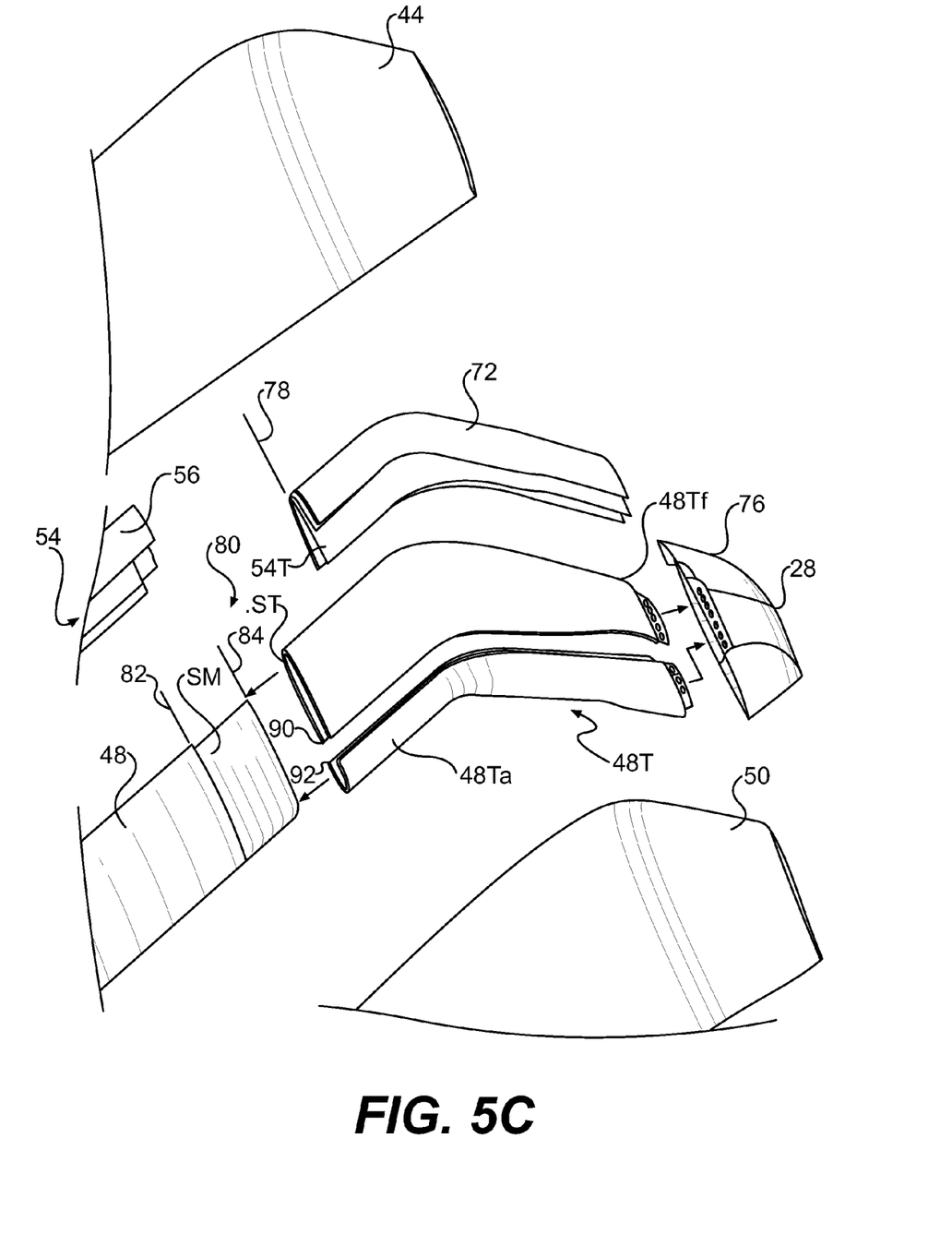
FIG. 5C is an exploded view of a tip section of the main rotor blade.
Figure 5D:
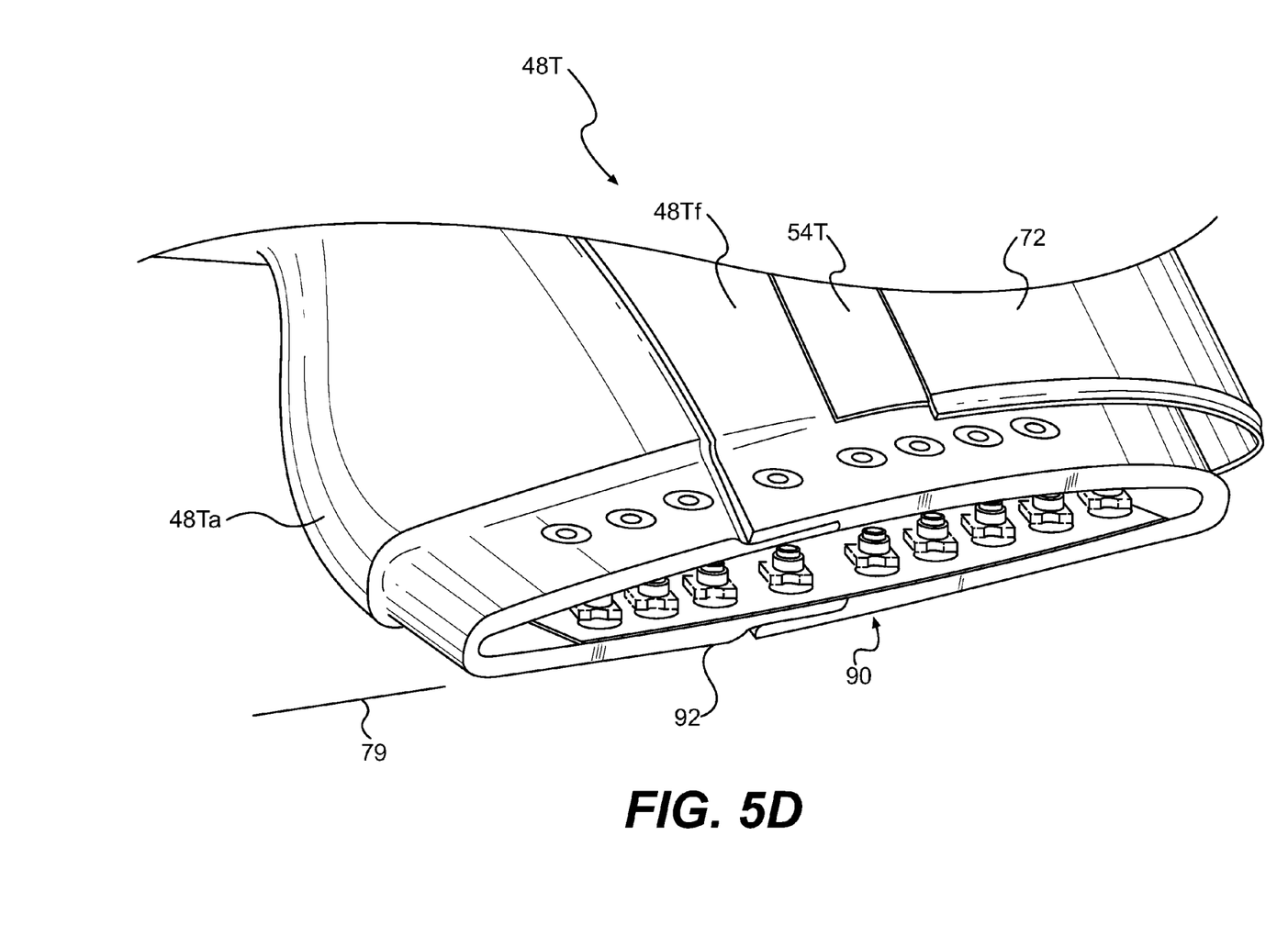
FIG. 5D is an expanded view of a distal end of a tip spar assembly without a tip cap mounted thereto.
Figure 5E:
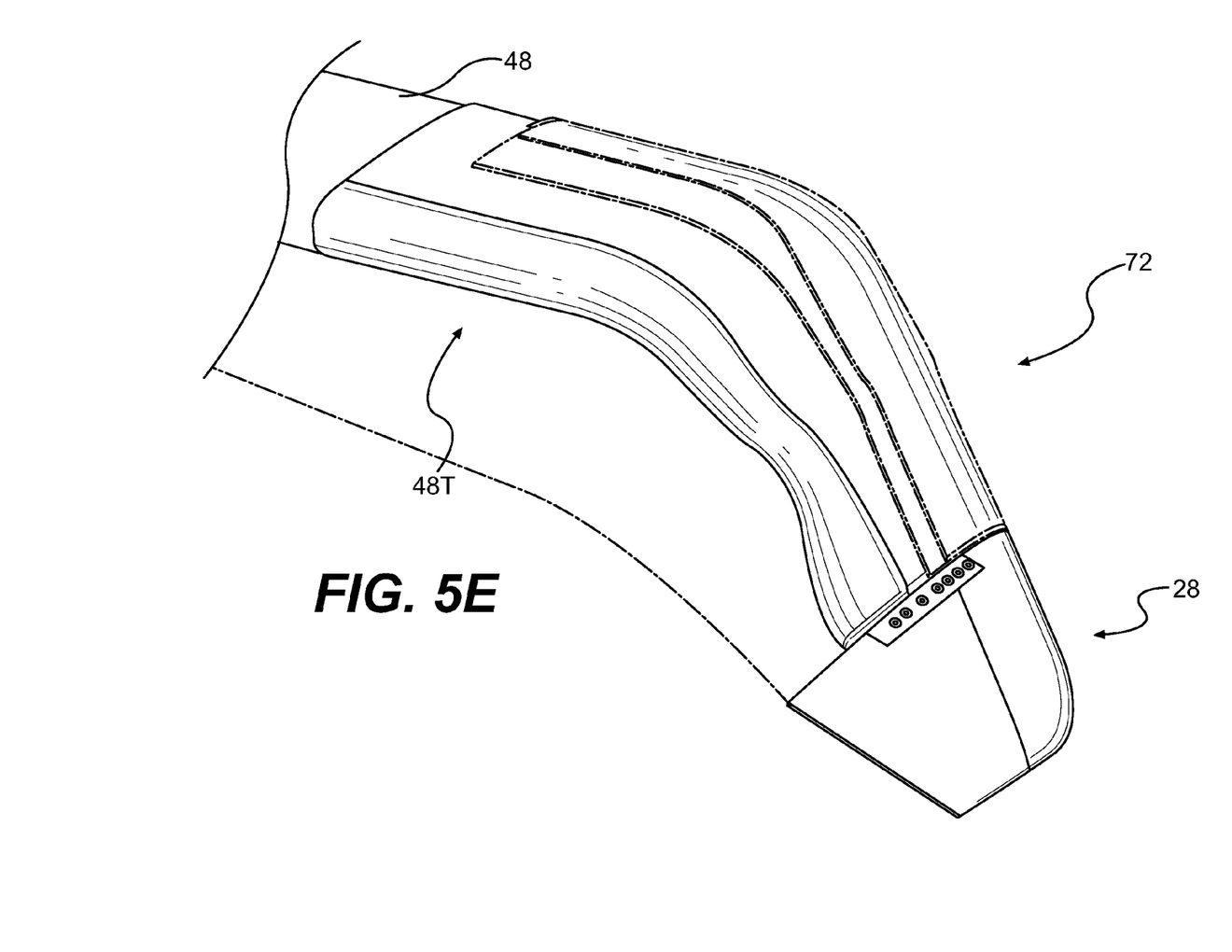
FIG. 5E is an expanded section view of a tip spar bonded to a main blade spar with a tip cap installed to the tip spar.
Figure 6:
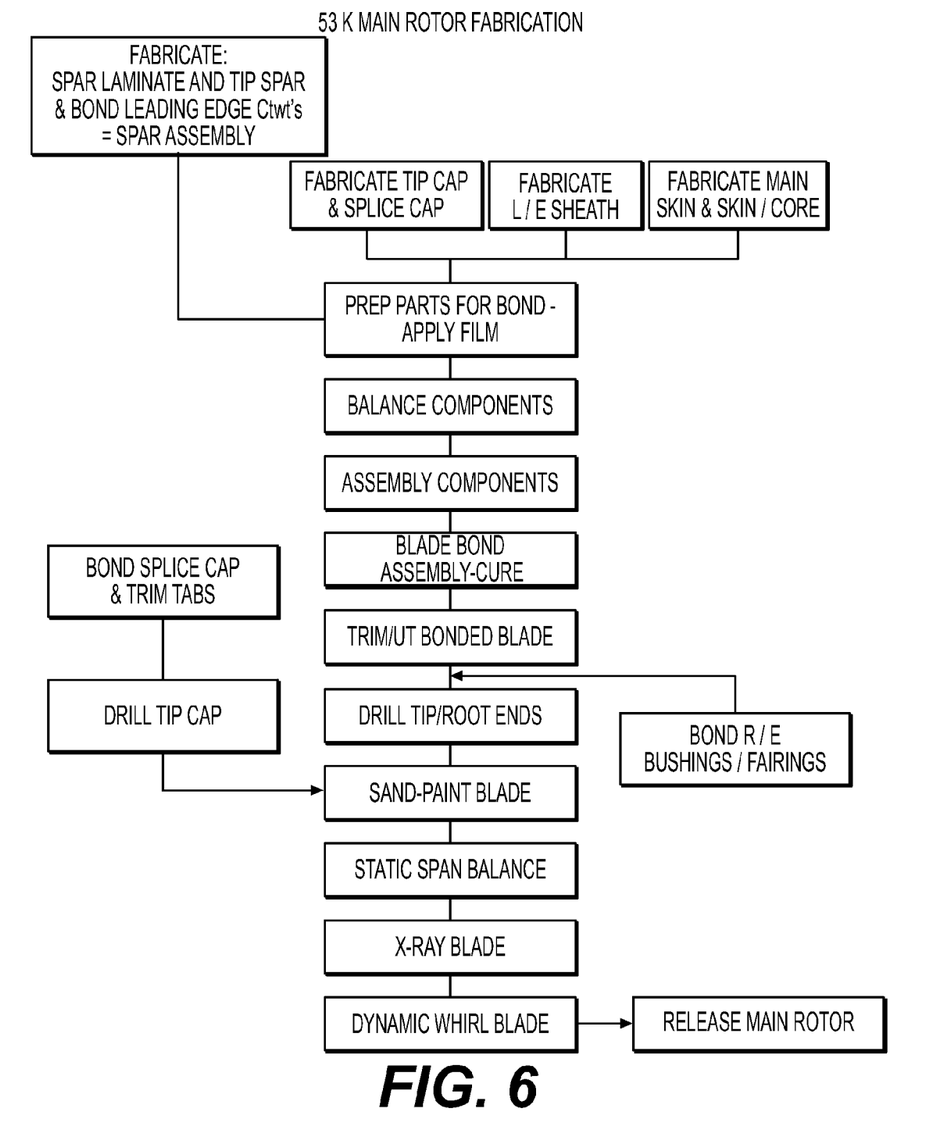
FIG. 6 is a chart illustrating one manufacturing plan of a main rotor blade in accordance with one non-limiting embodiment of the present invention.

Referring to FIG. 5C, the tip spar 48T may include a forward tip spar section 48Tf and an aft tip spar section 48Ta. The forward tip spar section 48Tf includes an open aft section 90 with a stepped inner mold line to receive the open aft section 90 of the forward tip spar section 48Tf of FIG. 5D. The aft tip spar section 48Ta includes an open forward section 92 with a stepped outer mold line. It should be understood that other overlap length, locations and interfaces may alternatively or additionally be provided. The forward and aft split arrangement facilitates assembly of the forward tip spar section 48Tf to the aft tip spar section 48Ta and the end section ST of the tip spar 48T over the end section SM of the main spar 48 (FIG. 5E). Assembly and manufacture of the main rotor blade assembly 20 may generally follow the manufacturing plan as schematically illustrated in FIG. 6.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The disclosed embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

The invention claimed is:

1. A main rotor blade assembly comprising:
   a main spar;
   a tip spar attached to said main spar at an interface; and
   a an upper blade skin which extends contiguously along said main spar and said tip spar from a root section to a tip section and over said interface; and
   a lower blade skin which extends contiguously along said main spar and said tip spar from said root section to said tip section and over said interface.

2. The main rotor blade assembly as recited in claim 1, wherein said tip spar is attached to said main spar in an overlap relationship at said interface.

3. The main rotor blade assembly as recited in claim 1, wherein an inboard end section of said tip spar is bonded over an outboard end section of said main spar at said interface.

4. The main rotor blade assembly as recited in claim 1, wherein said tip spar defines an anhedral form with a sweep.

5. The main rotor blade assembly as recited in claim 1, wherein said blade skin is contiguous over an interface between said main spar and said tip spar.

6. The main rotor blade assembly as recited in claim 1, further comprising a tip cap removably mounted to said tip spar at a tip cap interface.

7. The main rotor blade assembly as recited in claim 6, wherein said blade skin abuts said tip cap.

8. The main rotor blade assembly as recited in claim 1, wherein said tip spar comprises:
   a forward tip spar section which defines a non-straight form; and
   an aft tip section which defines a non-straight form, said aft tip section mountable to said forward tip spar along a longitudinal overlap.

9. A main rotor blade assembly comprising:
   a main spar;
   a tip spar attached to said main spar at an interface, said tip spar defining a non-straight form;

an upper blade skin which extends contiguously along said main spar and said tip spar from a root section to a tip section and over said interface; and a lower blade skin which extends contiguously along said main spar and said tip spar from said root section to said tip section and over said interface.

10. The main rotor blade assembly as recited in claim 9, wherein an end section of said main spar defines a stepped area to engage an end section of said tip spar at said interface.

11. The main rotor blade assembly as recited in claim 9, wherein an end section of said tip spar defines a stepped area to engage an end section of a tip cap.

12. The main rotor blade assembly as recited in claim 9, further comprising a tip cap removably mounted to said tip spar, said tip cap adjacent to said tip spar and said upper and lower blade skins.

13. The main rotor blade assembly as recited in claim 12, wherein said upper blade skin and said lower blade skin abut said tip cap.

14. The main rotor blade assembly as recited in claim 13, further comprising an erosion cap which overlaps an interface where said tip cap abuts said upper blade skin and said lower blade skin.

15. The main rotor blade assembly as recited in claim 13, further comprising
 a main core adjacent said main spar; and
 a tip core adjacent said main core, said tip core defining an anhedral form.

16. A method of assembling a main rotor blade assembly comprising:
 attaching a tip spar to a main spar at an interface; and
 attaching an upper blade skin and a lower blade skin which extend contiguously along said main spar and said tip spar from a root section to a tip section and over the interface.

17. A method as recited in claim 16, wherein attaching the upper blade skin and the lower blade skin to the main spar and the tip spar comprises: bonding the upper blade skin and the lower blade skin to the main spar and the tip spar.

18. A method as recited in claim 16, further comprising:
 removably fastening a tip cap to a tip section at least partially containing the tip spar.

19. A main rotor blade assembly comprising:
 a main spar;
 a tip spar attached to said main spar at an interface, said tip spar comprising:
  a forward tip spar section which defines a non-straight form;
  an aft tip section which defines a non-straight form, said aft tip section mountable to said forward tip spar along a longitudinal overlap; and
 an upper blade skin adjacent to said main spar and said tip spar which extends contiguously along said main spar and said tip spar from a root section to a tip section and over said interface; and
 a lower blade skin adjacent to said main spar and said tip spar which extends contiguously along said main spar and said tip spar from said root section to said tip section and over said interface.

20. The main rotor blade assembly as recited in claim 19, wherein said forward tip spar section comprises an open aft section with a stepped inner mold line to receive said aft tip spar section which comprises an open forward section with a stepped outer mold line.

21. The main rotor blade assembly as recited in claim 19, wherein said forward tip spar section and said aft tip spar section defines an anhedral form at an approximately ninety six percent a radial station (96% x/R).

22. The main rotor blade assembly as recited in claim 19, wherein an outboard end section of said tip spar comprises a reduced perimeter stepped section to removably attach a tip cap though hardware in a cap interface.

\* \* \* \* \*